No. 631,518. Patented Aug. 22, 1899.
J. BURKE.
ELECTRIC MOTOR OR GENERATOR.
(Application filed Dec. 27, 1898.)

(No Model.)

WITNESSES:
Geo. N. Heer
Edgar L. Tabbut

INVENTOR
James Burke
BY C. N. Edwards
ATTORNEY

THE NORRIS PETERS CO., PHOTO-LITHO., WASHINGTON, D. C.

UNITED STATES PATENT OFFICE.

JAMES BURKE, OF NEW YORK, N. Y.

ELECTRIC MOTOR OR GENERATOR.

SPECIFICATION forming part of Letters Patent No. 631,518, dated August 22, 1899.

Application filed December 27, 1898. Serial No. 700,332. (No model.)

*To all whom it may concern:*

Be it known that I, JAMES BURKE, a citizen of the United States, residing at New York, in the county of New York and State of New York, have invented certain new and useful Improvements in Motors or Generators, of which the following is a full, clear, and exact specification.

My invention relates to electric motors or generators, and has particular reference to the frames thereof.

The object of the invention is to construct a machine in which the armature shall be concentrically placed in the magnetic field in perfectly-alined bearings, which latter shall be permanent and not liable to displacement by use of the machine or other cause.

In machines heretofore constructed much difficulty has been experienced by reason of the bearings becoming displaced with respect to the frame, thereby shifting the armature out of its proper position in the field and affecting the alinement. This difficulty is usually encountered in reassembling the machine after the parts have been once separated and the bearings and armature removed. It is desirable that the armature should at all times be concentrically placed in the magnetic field and that the bearings supporting the armature should at all times be in perfect alinement with each other. It is further desirable that the armature be capable of being removed from the machine without being taken out of its bearings.

I propose to obviate the difficulties above mentioned and at the same time secure the advantages named by providing a frame or cradle in which the armature shall be adapted to be mounted, the frame being arranged to be secured in and form a part of the frame of the machine.

The invention also comprehends other features of novelty and advantage, which will more fully hereinafter appear.

Figure 2:
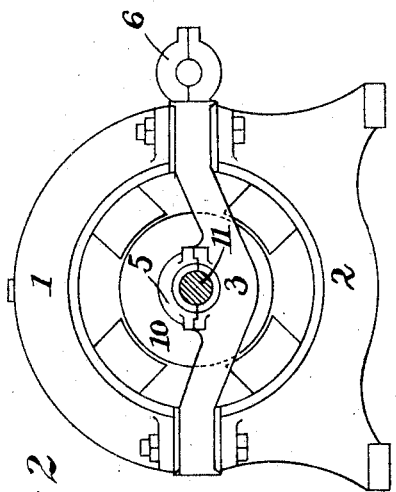
Figure 4:
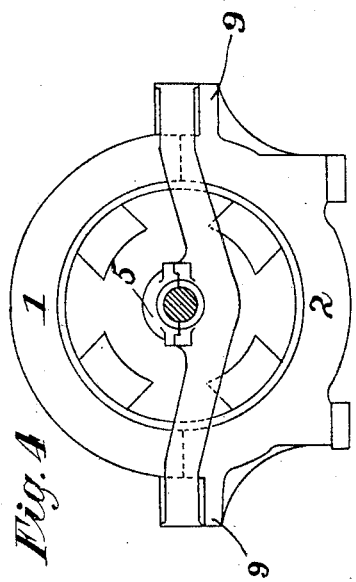
Figure 1:
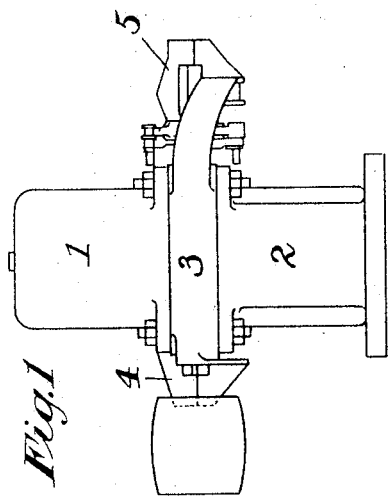
Figure 3:
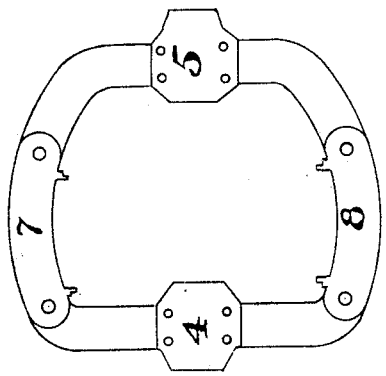

In the accompanying drawings, Figure 1 is a front view of a motor or generator constructed in accordance with my invention. Fig. 2 is an end view of Fig. 1. Fig. 3 is a top view of the frame or cradle which carries the armature, and Fig. 4 is an end view of a modified form of the invention.

Referring more particularly to the drawings, 1 and 2 are respectively the two halves of the frame of the machine, which in this instance is shown as a two-part frame.

3 represents the frame or cradle, having bearings 4 and 5, in which the armature is adapted to be mounted. The bearings are preferably cast integrally with the cradle, but may be put on separately in any suitable manner. The bearings should be provided with renewable bearing-boxes. The cradle may also be provided with other bearings—such, for instance, as 6—to support a counter-shaft to be used in connection with the armature-shaft through any suitable transmitting device. The form of the cradle is such that it will surround the frame of the machine, as illustrated in Fig. 4, or will be adapted to be clamped between the parts 1 and 2, as illustrated in Figs. 1 and 2. The latter form is the one which I prefer, and in this instance the cradle, or at least such parts of it as are clamped between the parts of the magnet-frame, should be of suitable magnetic conducting material, as such parts form part of the magnetic circuit.

In order to facilitate the construction of the machine, I provide suitable faces 7 8 for the cradle, against which the parts of the magnet-frame are adapted to be clamped. These faces may be suitably planed or otherwise machined to receive the ends of the magnet-frame parts. When the cradle is made to surround the magnet-frame, as shown in Fig. 4, the frame may be provided with suitable supports 9 9. In a construction such as shown in Fig. 4 it is obvious that the cradle will form no part of the magnetic circuit. The armature 10 is mounted upon its shaft 11 and the latter mounted in the bearings 4 and 5.

It will be understood that the invention is not limited for use with any particular type of machine and may be used with a machine having its magnet-frame composed of one or more parts. I therefore desire it to be understood that I do not limit myself to the precise construction and arrangement of parts herein shown.

It will be seen that the parts of the magnet-frame may be reversed with relation to the cradle or bearing-frame—that is, the part shown as the lower part in the drawings may be used as the upper part—and the machine thus reversed can then be readily attached to the ceiling.

The invention above described will be found particularly useful in connection with the construction of motors for street-cars or other vehicles, in which case the axle of the vehicle may pass through the bearing 6.

Having thus described my invention, I declare that what I claim as new, and desire to secure by Letters Patent, is—

1. In a motor or generator, the combination with the magnet-frame of the machine, of a cradle adapted to support the armature of the machine, and be supported by the magnet-frame, substantially as described.

2. In a motor or generator, the combination with the parts of the magnet-frame of the machine, of a cradle adapted to support the armature of the machine, and be supported between the parts of the magnet-frame, substantially as described.

3. In a motor or generator, the combination with the magnet-frame, of a cradle having a plurality of permanently-mounted bearings for the armature-shaft therein, said cradle being clamped to and supported by said magnet-frame, substantially as described.

In testimony whereof I affix my signature in presence of two witnesses.

JAMES BURKE.

Witnesses:
C. V. EDWARDS,
GEO. W. HESS.